United States Patent [19]

May et al.

[11] Patent Number: 5,844,627
[45] Date of Patent: Dec. 1, 1998

[54] STRUCTURE AND METHOD FOR REDUCING SPATIAL NOISE

[75] Inventors: William May, San Jose; Jean-Georges Fritsch, Los Altos, both of Calif.

[73] Assignee: Minerya System, Inc., Santa Clara, Calif.

[21] Appl. No.: 526,649

[22] Filed: Sep. 11, 1995

[51] Int. Cl.$^6$ .................................................. H04N 5/21
[52] U.S. Cl. .......................... 348/607; 348/625; 382/261
[58] Field of Search .................................. 348/607, 608, 348/624, 625, 627, 630, 909; 358/166, 167, 36, 37; 382/261, 205, 263; 364/724.13, 724.19; 375/350; H04N 5/21, 5/213

[56] References Cited

U.S. PATENT DOCUMENTS

| | | | |
|---|---|---|---|
| 4,612,575 | 9/1986 | Ishman | 348/208 |
| 5,045,945 | 9/1991 | Herman | 348/614 |

OTHER PUBLICATIONS

Article entitled "Digital Image Enhancement and Noise Filtering by Use of Local Statistics", Jong–Sen Lee, IEEE Transactions on Pattern Analysis and Machine Intelligence, vol. PAMI–2, No. 2, Mar. 1980, pp. 165–168.

Article entitled "Refined Filtering of Image Noise Using Local Statistics", Jong–Sen Lee, Computer Graphics and Image Processing, vol. 15, No. 4, Apr. 1981, pp. 380–389.

Article entitled "Adaptive Noise Smoothing Filter for Images with Signal–Dependent Noise", Darwin T. Kuan, Alexander A. Sawchuk, Timothy C. Strand and Pierre Chavel, IEEE Transactions on Pattern Analysis and Machine Intelligence, vol. PAMI–7, No. 2, Mar. 1985, pp. 165–177.

*Primary Examiner*—Sherrie Hsia
*Attorney, Agent, or Firm*—Skjerven, Morrill, MacPherson, Franklin & Friel LLP; Edward C. Kwok

[57] ABSTRACT

A digital filter for noise reduction selects between local variances obtained from adjacent pixels in the same frame and adjacent pixels in the same field. In one embodiment, the digital filter includes a filter modified from an adaptive Wiener filter which preserves edges and smoothes smooth areas of the image. A high compression ratio can be achieved in very smooth regions of the image without introducing artifacts.

10 Claims, 2 Drawing Sheets

STRUCTURE AND METHOD FOR REDUCING SPATIAL NOISE

BACKGROUND OF THE INVENTION

1. Field of the Invention

The present invention relates to digital video processing. In particular, the present invention relates digital filtering techniques for noise elimination.

2. Discussion of the Related Art

Video noise reduction filters are often provided for removing from a video image artifacts ("noise"), which are visible to a human viewer. The objective of noise removal is to create a visually pleasing image. Such noise-reduction filters include median filters, temporal recursive filters, and linear low-pass filters. Median filters often introduce additional artifacts which corrupt edges in the image. Temporal recursive filters often introduce into the image motion artifacts, such as motion blurs and ghosting. Linear low-pass filters often blur edges in the image. In general, these techniques are provided to remove visible defects from the image so that, for that purpose, introduction of such additional artifacts generally invisible to the eye is tolerated. However, in video signal processing, these "invisible" artifacts can be detrimental to other objectives, such as achieving a high compression ratio for storage and transmission of the video image. A lower compression ratio requires that the video processing system to operate at either a higher bit rate (in a variable bit rate encoding application) or a lower image quality (in a fixed bit rate encoding application).

In the prior art, the Wiener filter and its adaptive field/frame variants are noise-reduction digital filters which has been extensively studied. For example, some local Wiener filters are described in (i) "Digital Image Enhancement and Noise Filtering by Use of Local Statistics" by J. S. Lee, IEEE Transactions on Pattern Analysis and Machine Intelligence, Vol. PAMI-2, No 2, March 1985, pp. 165–168; (ii) "Refined Filtering of Image Noise Using Local Statistics", J. S. Lee, Computer Graphics and Image Processing 15, 380–389 (1981); and (iii) "Adaptive Noise Smoothing Filter for Images with Signal-Dependent Noise", Kuan et al, IEEE Transactions on Pattern Analysis and Machine Intelligence, Vol. PAMI-7, No. 2, March 1985, pp. 165–177. Specifically, local Wiener filters operate on each pixel of an image based on the mean value and the variance value of a finite number of pixels in the immediate vicinity of that pixel. Wiener filters are important in video compression processing for two reasons. First, Wiener filters remove noise that is not very visible by the eye, such as noise related to film grain. Second, as compared to the noise-reduction filters discussed above (e.g. the median filter), a Wiener filter is less prone to introduce new defects, especially those visible to the eye. Thus, Wiener filters are often used to improve compression efficiency.

SUMMARY OF THE INVENTION

The present invention provides both a circuit and a method for removing noise from a video image. Typically, the video image is formed by a sequence of successive frames, in which each frame includes a first field and a second field. The method of the present invention includes the steps of: (i) computing, for each pixel of a frame of the video image, a first variance ("frame-based variance") based on a predetermined number of pixels, in the pixel frame, adjacent that pixel; (ii) computing, for each pixel in the same frame of the video image, a second variance ("field-based variance") based on the predetermined number of pixels, selected from the field of that pixel, which are adjacent that pixel; (iii) selecting the lesser of the first variance and the second variance as a neighborhood variance; and (iv) filtering each pixel of the image using an adaptive filter having a filter coefficient which is a function of the neighborhood variance selected.

In one embodiment, an adaptive filter based on the principles of an adaptive Wiener filter is provided to filter the video image. The pixels used for computing the field-base and the frame-based variances are selected from 3×3 configurations, centered around the pixel to be filtered, in the respective field or frame. The adaptive filter is designed to have filter characteristics which both preserve sharpness of the video image at the edges and smooth regions of the image having a relatively low variance.

The present invention provides a filter that, while effective in removing visible artifacts, improves encoder efficiency. Encoder efficiency is achieved by elimination of invisible artifacts of the image in smooth regions, so that fewer bits are required to encode the image without degradation of the visible image. The filter of the present invention has high performance in reducing both frame-based noise (e.g. in still images, inverse telecined images, or deinterlaced images) and field-based noise (e.g. video images with high motion content). Because the filter of the present invention is adaptive on a pixel by pixel basis, the filter correctly preserves both frame based (e.g. in the portion of the image where there is little motion) and field based (in the portion of the image where there is motion) characteristics in the same image.

The present invention is better understood upon consideration of the detailed description below and the accompanying drawings.

DETAILED DESCRIPTION OF THE PREFERRED EMBODIMENTS

Figure 1:
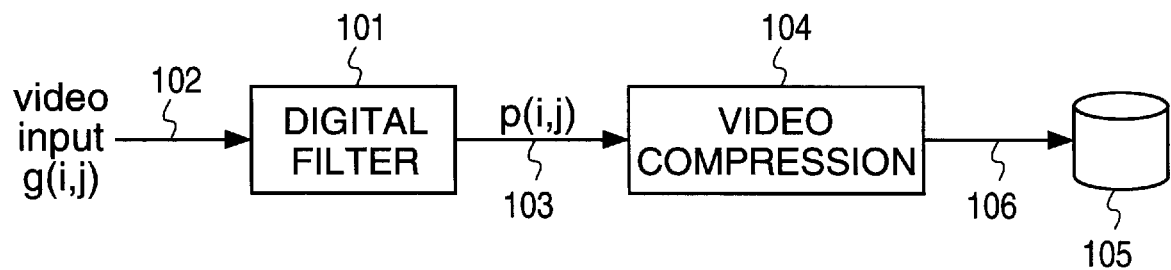
FIG. 1 shows a digital filter 101 used to remove noise from a video signal prior to data compression.

One embodiment of the present invention is used in a video data compression system, such as that shown in FIG. 1. FIG. 1 shows a stream 102 of digitized video data being provided to a digital filter 101 for noise removal. The filtered data stream 103 is provided to a conventional video compression system 104, such as the Minerva Compressionist, available from Minerva Systems, Santa Clara, Calif. The compressed data, indicated by reference numeral 106, can then be stored in a mass storage medium, indicated by reference numeral 105, to be retrieved later for further processing or reproduction.

Figure 2:
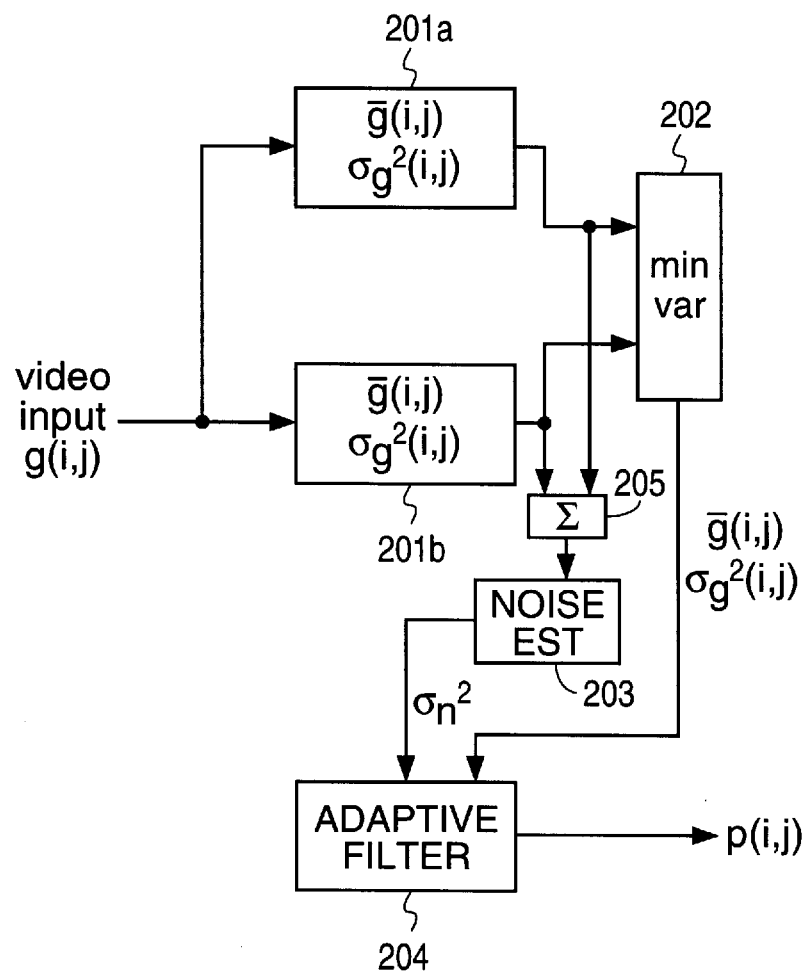
FIG. 2 illustrates the operation of the filter 101 in accordance with the present invention.
Figure 3A:
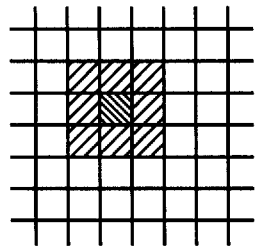
FIG. 3a shows a pixel's 3×3 neighborhood formed by pixels in the same frame; the pixel to be filtered is shown in solid, and its eight neighbors in the neighborhood shown in shade.
Figure 3B:
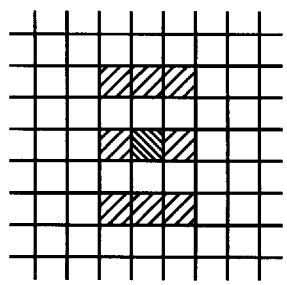
FIG. 3b shows a pixel's 3×3 neighborhood formed by pixels of the same field; the pixel to be filtered is shown in solid, and its eight neighbors in the neighborhood shown in shade.

Digital filter 101 can be provided by the filter sequence shown in FIG. 2. As shown in FIG. 2, as represented by step 201a, a neighborhood mean ("frame-based mean") and a neighborhood variance ("frame-based variance") are computed for each pixel, based on averaging and computing the variance of the nine pixels in the pixel's 3×3 pixel neighborhood, where these pixels are selected from the frame (both fields) of the pixel. FIG. 3a shows the nine pixels in the 3×3 neighborhood, showing the pixel to be filtered in solid and the pixel's eight adjacent pixels shaded. In addition, as represented by step 201b, a neighborhood mean ("field-based mean") and a neighborhood variance ("field-based variance") are computed for each pixel, based on averaging and computing the variance of the nine pixels of the same field in the pixel's 3×3 pixel neighborhood. FIG. 3b shows the pixels in that 3×3 neighborhood, showing the pixel to be filtered in solid and the eight adjacent pixels of the neighborhood shaded. Then, at the next step, designated by reference numeral 202, for each pixel g(i,j) in the frame, the smaller of the frame-based and field-based neighborhood variances, and its associated neighborhood mean, are chosen to be the neighborhood variance (designated $\sigma_g^2(i,j)$) and neighborhood mean (designated $\bar{g}(i,j)$), respectively, for that pixel. Independently, at step 205, the frame-based and field-based neighborhood variances obtained at steps 201a and 201b are summed and accumulated for the entire image. The resulting value is used, at step 203, to compute a noise variance (designated $\sigma_n^2$) for a global noise signal. $\sigma_n^2$ can be computed in one of several ways. In the present embodiment, for example, where the global noise signal is modelled as a white noise process, $\sigma_n^2$ is obtained by:

$$\sigma_n^2 = a \Sigma \sigma_g^2$$

where a is a "preset" scaling constant. This approach of deriving a variance for the global noise signal has the advantage of simplicity, and the degree of noise filtering can be controlled by varying the scaling constant. However, this approach has the drawback of being sensitive to visual activities in an image. For example, this approach results in blurring ("over-filtering") of busy images.

Alternatively, noise variance $\sigma_n^2$ can also be obtained by estimating noise in one or more reference areas. The reference area or areas can be obtained by either (i) having the user selects a smooth area in a "typical" image of the source material, or (ii) automatically search for smooth areas in the images of the source material. The selected reference area, or areas, is then used to compute noise variance $\sigma_n^2$ using one of the known statistical techniques. The resulting noise variance $\sigma_n^2$ is then used estimate noise in all images of the source material. This alternative approach avoids the over-filtering mentioned above.

The filtered value p(i,j) of pixel g(i,j) is then obtained, at step 204, according to an adaptive Wiener filter model:

$$p(i,j) = \bar{g}(i,j) + \frac{\sigma_g^2}{\sigma_g^2 + \sigma_n^2} (g(i,j) - \bar{g}(i,j))$$

The Wiener filter of the present embodiment has the characteristic that, if the neighborhood variance $\sigma_g^2$, whether obtained from the field-based or from the frame-based neighborhood variance, is relatively high, the output filtered value p(i,j) is close to the input pixel value g(i,j). Hence, the edges of an image will remain relatively sharp. However, if the neighborhood variance is relatively low, the output filtered value p(i,j) is close to the neighborhood mean value $\bar{g}(i,j)$. Thus, in a relatively smooth region of the image, the local area of the output pixels are made even smoother. Consequently, higher compression ratio can be achieved in these smooth regions without sacrificing image quality. By selecting the neighborhood variance and neighborhood mean from the smaller of the field-based and frame-based neighborhood variances, characteristics of various video formats can be exploited to achieve noise reduction. For example, if the video sequence is obtained by inverse telecine, adjacent lines (although representing pixels from different fields) are effective in providing noise reduction. However, if the video sequence is obtained from an interlaced source, where adjacent lines are separated temporally, the use of field-base neighborhood variances is more effective in providing noise reduction.

Performance of the digital filter described above has been compared with the performances of a number of median filters that are provided with edge maps to suppress edge filtering. Such median filters include a 3×3 median filter, a separable median filter, a median of medians filter, and a 1×5 point median filter. The digital filter described above results in consistently lower bit rates (5% to 20%), without creating any visible artifact. Additional tests also showed that video material filtered in accordance with the present invention can always be compressed at a lower bit rate than a corresponding adaptive Wiener filter which does not choose between frame-based and field-based variances.

The detailed description above is provided to illustrate the specific embodiments of the present invention and should not be taken as limiting the present invention. Numerous variation and modification within the present invention are possible. The present invention is defined by the following claims.

We claim:

1. A digital filter for removing noise in a video image, said video image formed by successive frames, each frame including first and second fields, each field including multiple pixels, said digital filter comprising:

means for computing, for each pixel of a frame of said video image, (i) a first variance based on a first group of pixels, selected from said frame, adjacent said pixel; and (ii) a second variance based on a second group of pixels, adjacent said pixel and equal in number as said first group of pixels, selected from the field which includes said pixel;

means for selecting, as a neighborhood variance, the lesser of said first variance and said second variance; and an adaptive filter, receiving said video image and said neighborhood variance, said adaptive filter having a filter coefficient which is a function of said neighborhood variance.

2. A digital filter as in claim 1, wherein said adaptive filter being an adaptive Wiener filter.

3. A digital filter as in claim 1, wherein said first and second groups of pixels each form a 3×3 configuration centered at said pixel in a respective frame or field.

4. A digital filter as in claim 1, wherein said adaptive filter has filter characteristics that preserve sharpness of edges and smooth regions of said video image having a relatively low variance.

5. A digital filter as in claim 1, further comprising:

means for computing a first mean based on said first group of pixels; and means for computing a second mean based on said second group of pixels;

wherein said means for selecting selects, as a neighborhood mean, from said first mean and said second mean, the mean computed from the same group of pixels used to compute said neighborhood variance.

6. A method for removing noise in a video image, said video image formed by successive frames, each frame including first and second fields, each field including multiple pixels, said method comprising:

computing, for each pixel of a frame of said video image, a first variance based on a first group of pixels, in said frame, adjacent said pixel;

computing, for each pixel of said frame of said video image, a second variance based on a second group of pixels, selected from the field which includes said pixel and equal in number as said first group of pixels, adjacent said pixel;

selecting the lesser of said first variance and said second variance as a neighborhood variance; and filtering said pixel using an adaptive filter having a filter coefficient which is a function of said neighborhood variance.

7. A method as in claim 6, wherein said adaptive filter being an adaptive Wiener filter.

8. A method as in claim 6, wherein said first group of pixels and said second group of pixels each form a 3×3 configuration centered at said pixel in a respective frame or field.

9. A method as in claim 1, wherein said adaptive filter has filter characteristics that preserve sharpness of edges and smooth regions of said video image having a relatively low variance.

10. A method as in claim 1, further comprising the steps of:

computing a first mean based on said first group of pixels;

computing a second mean based on said second group of pixels; and selecting, as a neighborhood mean, from said first mean and said second mean, the mean computed from the same group of pixels used to compute said neighborhood variance.

\* \* \* \* \*